(12) United States Patent
Gupta

(10) Patent No.: US 7,756,546 B1
(45) Date of Patent: Jul. 13, 2010

(54) METHODS AND APPARATUSES TO INDICATE FIXED TERMINAL CAPABILITIES

(75) Inventor: Rajeev Gupta, Sunnyvale, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 597 days.

(21) Appl. No.: 11/095,795

(22) Filed: Mar. 30, 2005

(51) Int. Cl.
*H04M 1/00* (2006.01)

(52) U.S. Cl. ............... 455/552.1; 455/550.1; 455/553.1; 455/132; 455/161.1; 370/310.2; 370/328; 370/329; 370/338

(58) Field of Classification Search .............. 455/414.1, 455/426.1, 550.1, 552.1, 553.1, 554.2, 555, 455/557, 433, 41.2, 435.1–435.3, 426.2, 455/561, 554.1, 566.1, 556.2, 556.1, 560, 455/132, 161.1; 370/338, 352, 389, 464, 370/467, 468, 252, 310.2, 328, 329

See application file for complete search history.

(56) References Cited

U.S. PATENT DOCUMENTS

| | | | |
|---|---|---|---|
| 5,101,501 A | 3/1992 | Gilhousen et al. |
| 5,109,528 A | 4/1992 | Uddenfeldt |
| 5,226,045 A | 7/1993 | Chuang |
| 5,235,632 A | 8/1993 | Raith |
| 5,260,944 A | 11/1993 | Tomabechi |
| 5,260,988 A | 11/1993 | Schellineig et al. |
| 5,267,261 A | 11/1993 | Blakeney, II et al. |
| 5,367,558 A | 11/1994 | Gillis et al. |
| 5,390,233 A | 2/1995 | Jensen et al. |
| 5,392,331 A | 2/1995 | Patsiokas et al. |
| 5,406,615 A | 4/1995 | Miller et al. |
| 5,428,601 A | 6/1995 | Owen |
| 5,442,680 A | 8/1995 | Schellinger et al. |
| 5,448,619 A | 9/1995 | Evans et al. |
| 5,507,035 A | 4/1996 | Bantz et al. |
| 5,533,027 A | 7/1996 | Akerberg et al. |
| 5,594,782 A | 1/1997 | Zicker et al. |
| 5,610,969 A | 3/1997 | McHenry |
| 5,634,193 A | 5/1997 | Ghisler |
| 5,640,414 A | 6/1997 | Blakeney, II et al. |
| 5,659,598 A | 8/1997 | Byrne |

(Continued)

FOREIGN PATENT DOCUMENTS

| | | |
|---|---|---|
| EP | 0936777 A1 | 8/1999 |
| EP | 1207708 B1 | 10/2004 |
| GB | 2282735 A | 4/1995 |
| WO | WO 9204796 A1 | 3/1992 |
| WO | WO 9724004 A1 | 7/1997 |

(Continued)

OTHER PUBLICATIONS

U.S. Appl. No. 10/116,023, filed Apr. 2, 2002, Mohammed, Jahangir, Non-Final Office Action of related case mailed: Apr. 13, 2006.

(Continued)

*Primary Examiner*—Charles N Appiah
*Assistant Examiner*—Olumide T Ajibade Akonai
(74) *Attorney, Agent, or Firm*—Adeli & Tollen LLP

(57) ABSTRACT

Embodiments of the invention provide methods and apparatuses for incorporating fixed terminal devices within an integrated wireless system using a fixed terminal adaptor, and to indicate the capabilities of the fixed terminal adaptor. In accordance with one embodiment, a fixed terminal adaptor is enabled to indicate its capabilities to the network controller of the integrated wireless system. For one such embodiment, the network controller is able to select the appropriate bearer mechanisms to support the expected fixed terminal services.

9 Claims, 5 Drawing Sheets

U.S. PATENT DOCUMENTS

| | | | |
|---|---|---|---|
| 5,659,878 A | 8/1997 | Uchida et al. | |
| 5,664,005 A | 9/1997 | Emery et al. | |
| 5,673,307 A | 9/1997 | Holland et al. | |
| 5,675,629 A | 10/1997 | Raffel et al. | |
| 5,724,658 A | 3/1998 | Hasan | |
| 5,732,076 A | 3/1998 | Ketseoglou et al. | |
| 5,745,852 A | 4/1998 | Khan et al. | |
| 5,758,281 A | 5/1998 | Emery et al. | |
| 5,796,727 A | 8/1998 | Harrison et al. | |
| 5,796,729 A | 8/1998 | Greaney et al. | |
| 5,815,525 A | 9/1998 | Smith et al. | |
| 5,818,820 A | 10/1998 | Anderson et al. | |
| 5,822,681 A | 10/1998 | Chang et al. | |
| 5,825,759 A | 10/1998 | Liu | |
| 5,852,767 A | 12/1998 | Sugita | |
| 5,870,677 A | 2/1999 | Takahashi et al. | |
| 5,887,020 A | 3/1999 | Smith et al. | |
| 5,887,260 A | 3/1999 | Nakata | |
| 5,890,055 A | 3/1999 | Chu et al. | |
| 5,890,064 A | 3/1999 | Widergen et al. | |
| 5,903,834 A | 5/1999 | Wallstedt et al. | |
| 5,915,224 A | 6/1999 | Jonsson | |
| 5,926,760 A | 7/1999 | Khan et al. | |
| 5,936,949 A | 8/1999 | Pasternak et al. | |
| 5,940,512 A | 8/1999 | Tomoike | |
| 5,946,622 A | 8/1999 | Bojeryd | |
| 5,949,773 A | 9/1999 | Bhalla et al. | |
| 5,960,341 A | 9/1999 | LeBlanc et al. | |
| 5,995,828 A | 11/1999 | Nishida | |
| 6,016,318 A | 1/2000 | Tomoike | |
| 6,032,034 A * | 2/2000 | Rabina et al. | 455/401 |
| 6,035,193 A | 3/2000 | Buhrmann et al. | |
| 6,052,592 A | 4/2000 | Schellinger et al. | |
| 6,101,176 A | 8/2000 | Honkasalo | |
| 6,112,080 A | 8/2000 | Anderson et al. | |
| 6,112,088 A | 8/2000 | Haartsen | |
| 6,119,000 A | 9/2000 | Stephenson et al. | |
| 6,128,293 A * | 10/2000 | Pfeffer | 370/359 |
| 6,130,886 A | 10/2000 | Ketseoglou et al. | |
| 6,134,227 A | 10/2000 | Magana | |
| 6,138,019 A | 10/2000 | Trompower et al. | |
| 6,157,846 A * | 12/2000 | Manning et al. | 455/557 |
| 6,226,515 B1 | 5/2001 | Pauli | |
| 6,236,852 B1 | 5/2001 | Veerasamy et al. | |
| 6,243,581 B1 | 6/2001 | Jawanda | |
| 6,246,489 B1 * | 6/2001 | Park | 358/1.15 |
| 6,256,511 B1 | 7/2001 | Brown | |
| 6,263,211 B1 | 7/2001 | Brunner | |
| 6,269,086 B1 | 7/2001 | Magana et al. | |
| 6,320,873 B1 | 11/2001 | Nevo et al. | |
| 6,327,470 B1 | 12/2001 | Ostling | |
| 6,359,872 B1 | 3/2002 | Mahany et al. | |
| 6,374,102 B1 | 4/2002 | Brachman et al. | |
| 6,381,457 B1 | 4/2002 | Carlsson et al. | |
| 6,389,059 B1 | 5/2002 | Smith et al. | |
| 6,415,158 B1 | 7/2002 | King et al. | |
| 6,430,395 B2 | 8/2002 | Arazi et al. | |
| 6,445,921 B1 | 9/2002 | Bell | |
| 6,462,644 B1 * | 10/2002 | Howell et al. | 340/5.92 |
| 6,463,307 B1 | 10/2002 | Larsson et al. | |
| 6,512,924 B2 * | 1/2003 | Sawada et al. | 455/435.1 |
| 6,539,237 B1 | 3/2003 | Sayers et al. | |
| 6,542,516 B1 | 4/2003 | Vialen et al. | |
| 6,553,219 B1 | 4/2003 | Vilander et al. | |
| 6,556,822 B1 | 4/2003 | Matsumoto | |
| 6,556,825 B1 | 4/2003 | Mansfield | |
| 6,556,830 B1 | 4/2003 | Lenzo | |
| 6,574,266 B1 | 6/2003 | Haartsen | |
| 6,587,444 B1 | 7/2003 | Lenzo et al. | |
| 6,597,702 B1 * | 7/2003 | Caugherty | 370/410 |
| 6,633,761 B1 | 10/2003 | Singhal | |
| 6,643,512 B1 | 11/2003 | Ramaswamy | |
| 6,647,426 B2 | 11/2003 | Mohammed | |
| 6,658,250 B1 | 12/2003 | Ganesan et al. | |
| 6,665,276 B1 | 12/2003 | Culbertson et al. | |
| 6,675,009 B1 | 1/2004 | Cook | |
| 6,680,923 B1 | 1/2004 | Leon | |
| 6,711,400 B1 | 3/2004 | Aura | |
| 6,751,477 B1 * | 6/2004 | Alperovich et al. | 455/560 |
| 6,757,277 B1 * | 6/2004 | Shaffer et al. | 370/356 |
| 6,766,160 B1 | 7/2004 | Lemilainen | |
| 6,788,656 B1 | 9/2004 | Smolentzov et al. | |
| 6,801,519 B1 | 10/2004 | Mangel | |
| 6,801,772 B1 | 10/2004 | Townend et al. | |
| 6,801,777 B2 | 10/2004 | Rusch | |
| 6,807,417 B2 | 10/2004 | Sallinen | |
| 6,824,048 B1 | 11/2004 | Itabashi et al. | |
| 6,826,154 B2 | 11/2004 | Subbiah et al. | |
| 6,829,227 B1 | 12/2004 | Pitt | |
| 6,842,462 B1 | 1/2005 | Ramjee et al. | |
| 6,845,095 B2 | 1/2005 | Krishnarajah et al. | |
| 6,895,255 B1 | 5/2005 | Bridgelall | |
| 6,909,705 B1 | 6/2005 | Lee et al. | |
| 6,922,559 B2 | 7/2005 | Mohammed | |
| 6,925,074 B1 * | 8/2005 | Vikberg et al. | 370/338 |
| 6,937,862 B2 | 8/2005 | Back et al. | |
| 6,970,719 B1 | 11/2005 | McConnell et al. | |
| 6,999,761 B2 * | 2/2006 | Bacon et al. | 455/426.2 |
| 7,002,992 B1 * | 2/2006 | Shaffer et al. | 370/468 |
| 7,009,952 B1 | 3/2006 | Razavilar et al. | |
| 7,110,791 B2 * | 9/2006 | Izumi | 455/557 |
| 7,151,949 B2 * | 12/2006 | Cavill et al. | 455/556.1 |
| 7,307,980 B1 * | 12/2007 | Shah | 370/352 |
| 7,379,877 B2 * | 5/2008 | Lehtimaki | 704/500 |
| 2001/0029186 A1 | 10/2001 | Canyon et al. | |
| 2001/0031645 A1 | 10/2001 | Jarrett | |
| 2001/0046860 A1 | 11/2001 | Lee | |
| 2001/0049790 A1 | 12/2001 | Faccin et al. | |
| 2002/0045459 A1 | 4/2002 | Morikawa | |
| 2002/0066036 A1 | 5/2002 | Makineni | |
| 2002/0075844 A1 | 6/2002 | Hagen | |
| 2002/0082015 A1 | 6/2002 | Wu | |
| 2002/0085516 A1 | 7/2002 | Bridgelall | |
| 2002/0091843 A1 * | 7/2002 | Vaid | 709/230 |
| 2002/0102974 A1 | 8/2002 | Raith | |
| 2002/0118674 A1 | 8/2002 | Faccin et al. | |
| 2002/0132630 A1 | 9/2002 | Arazi et al. | |
| 2002/0142761 A1 | 10/2002 | Wallstedt et al. | |
| 2002/0147008 A1 | 10/2002 | Kallio | |
| 2002/0147016 A1 | 10/2002 | Arazi et al. | |
| 2002/0155829 A1 | 10/2002 | Proctor, Jr. et al. | |
| 2002/0160811 A1 | 10/2002 | Jannette et al. | |
| 2002/0166068 A1 | 11/2002 | Kilgore | |
| 2002/0191575 A1 | 12/2002 | Kalavade et al. | |
| 2002/0197984 A1 | 12/2002 | Monin et al. | |
| 2003/0007475 A1 | 1/2003 | Tsuda et al. | |
| 2003/0031151 A1 | 2/2003 | Sharma et al. | |
| 2003/0043773 A1 | 3/2003 | Chang | |
| 2003/0087653 A1 | 5/2003 | Leung | |
| 2003/0100335 A1 * | 5/2003 | Gassho et al. | 455/552 |
| 2003/0112789 A1 | 6/2003 | Heinonen | |
| 2003/0119480 A1 | 6/2003 | Mohammed | |
| 2003/0119490 A1 | 6/2003 | Mohammed | |
| 2003/0119527 A1 | 6/2003 | Labun | |
| 2003/0119548 A1 | 6/2003 | Mohammed | |
| 2003/0130008 A1 | 7/2003 | Rajaniemi et al. | |
| 2003/0139180 A1 | 7/2003 | McIntosh et al. | |
| 2003/0142673 A1 | 7/2003 | Patil | |
| 2003/0162544 A1 * | 8/2003 | Austin et al. | 455/445 |
| 2003/0176186 A1 * | 9/2003 | Mohammed | 455/432.1 |
| 2003/0193952 A1 | 10/2003 | O'Neill | |
| 2003/0210199 A1 | 11/2003 | Sward et al. | |
| 2003/0219024 A1 | 11/2003 | Purnadai et al. | |
| 2004/0008649 A1 | 1/2004 | Wybenga | |

| | | | |
|---|---|---|---|
| 2004/0009749 A1 | 1/2004 | Arazi et al. | |
| 2004/0013099 A1 | 1/2004 | O'Neill | |
| 2004/0037312 A1 | 2/2004 | Spear | |
| 2004/0053623 A1 | 3/2004 | Hoff et al. | |
| 2004/0068571 A1 | 4/2004 | Ahmavaara | |
| 2004/0077355 A1 | 4/2004 | Krenik et al. | |
| 2004/0077356 A1 | 4/2004 | Krenik et al. | |
| 2004/0077374 A1 | 4/2004 | Terry | |
| 2004/0116120 A1 | 6/2004 | Mohammed et al. | |
| 2004/0125812 A1* | 7/2004 | Kao et al. | 370/401 |
| 2004/0147223 A1 | 7/2004 | Cho | |
| 2004/0171378 A1 | 9/2004 | Rautila | |
| 2004/0192211 A1 | 10/2004 | Gallagher et al. | |
| 2004/0202132 A1 | 10/2004 | Heinonen | |
| 2004/0203346 A1 | 10/2004 | Myhre et al. | |
| 2004/0203737 A1 | 10/2004 | Myhre et al. | |
| 2004/0203800 A1 | 10/2004 | Myhre et al. | |
| 2004/0203815 A1 | 10/2004 | Shoemake et al. | |
| 2004/0208150 A1* | 10/2004 | Chang et al. | 370/338 |
| 2004/0235482 A1* | 11/2004 | Sylvain | 455/445 |
| 2005/0009560 A1* | 1/2005 | Cavill et al. | 455/556.1 |
| 2005/0064896 A1 | 3/2005 | Rautiola et al. | |
| 2005/0101245 A1 | 5/2005 | Ahmavaara | |
| 2005/0101329 A1 | 5/2005 | Gallagher | |
| 2005/0181805 A1 | 8/2005 | Gallagher | |
| 2005/0186948 A1 | 8/2005 | Gallagher | |
| 2005/0198199 A1 | 9/2005 | Dowling | |
| 2005/0207395 A1 | 9/2005 | Mohammed | |
| 2005/0250488 A1* | 11/2005 | Carbonaro | 455/426.1 |
| 2005/0255879 A1 | 11/2005 | Shi | |
| 2005/0265279 A1 | 12/2005 | Markovic | |
| 2005/0266853 A1 | 12/2005 | Gallagher | |
| 2005/0271008 A1 | 12/2005 | Gallagher | |
| 2005/0272424 A1 | 12/2005 | Gallagher | |
| 2005/0272449 A1 | 12/2005 | Gallagher | |
| 2006/0009201 A1 | 1/2006 | Gallagher | |
| 2006/0009202 A1 | 1/2006 | Gallagher | |
| 2006/0019656 A1 | 1/2006 | Gallagher | |
| 2006/0019657 A1 | 1/2006 | Gallagher | |
| 2006/0019658 A1 | 1/2006 | Gallagher | |
| 2006/0025143 A1 | 2/2006 | Gallagher | |
| 2006/0025144 A1 | 2/2006 | Gallagher | |
| 2006/0025145 A1 | 2/2006 | Gallagher | |
| 2006/0025146 A1 | 2/2006 | Gallagher | |
| 2006/0025147 A1 | 2/2006 | Gallagher | |
| 2006/0079258 A1 | 4/2006 | Gallagher | |
| 2006/0079259 A1 | 4/2006 | Gallagher | |
| 2006/0079273 A1 | 4/2006 | Gallagher | |
| 2006/0079274 A1 | 4/2006 | Gallagher | |
| 2006/0094431 A1* | 5/2006 | Saifullah et al. | 455/436 |
| 2006/0098598 A1 | 5/2006 | Gallagher | |
| 2006/0109867 A1* | 5/2006 | Souissi | 370/493 |
| 2006/0153108 A1* | 7/2006 | Nakajima | 370/286 |
| 2006/0251051 A1* | 11/2006 | Bhatt et al. | 370/352 |

FOREIGN PATENT DOCUMENTS

| | | |
|---|---|---|
| WO | WO 9948312 A1 | 9/1999 |
| WO | WO 9948315 A1 | 9/1999 |
| WO | WO 0028762 A1 | 5/2000 |
| WO | WO 0051387 A1 | 8/2000 |
| WO | WO 02/45456 A1 | 6/2002 |
| WO | WO 03039009 A2 | 5/2003 |
| WO | WO 03039009 A3 | 5/2003 |
| WO | WO 03092312 A1 | 11/2003 |
| WO | WO 2004002051 A2 | 12/2003 |
| WO | WO 2004034219 A2 | 4/2004 |
| WO | WO 2004039111 A1 | 5/2004 |
| WO | WO 2005006597 A1 | 1/2005 |
| WO | WO 2005107169 A1 | 11/2005 |
| WO | WO 2005107297 A1 | 11/2005 |
| WO | WO 2005114918 A3 | 3/2006 |

OTHER PUBLICATIONS

U.S. Appl. No. 11/004,439, filed Dec. 3, 2004, Gallagher, Michael, Non-Final Office Action of related case mailed: Apr. 21, 2006.
U.S. Appl. No. 11/225,398, filed Sep. 12, 2005, Gallagher, Michael, Non-Final Office Action of related case mailed: Apr. 5, 2006.
U.S. Appl. No. 11/225,871, filed Sep. 12, 2005, Gallagher, Michael, Non-Final Office Action of related case mailed: Mar. 30, 2006.
U.S. Appl. No. 11/225,872, filed Sep. 12, 2005, Gallagher, Michael, Non-Final Office Action of related case mailed: May 8, 2006.
U.S. Appl. No. 11/226,610, filed Sep. 13, 2005, Gallagher, Michael, Non-Final Office Action of related case mailed: Mar. 29, 2006.
U.S. Appl. No. 11/226,617, filed Sep. 13, 2005, Gallagher, Michael, Non-Final Office Action of related case mailed: Apr. 4, 2006.
U.S. Appl. No. 11/227,573, filed Sep. 14, 2005, Gallagher, Michael, Non-Final Office Action of related case mailed: Apr. 16, 2006.
U.S. Appl. No. 11/227,784, filed Sep. 14, 2005, Gallagher, Michael, Non-Final Office Action of related case mailed: Mar. 28, 2006.
U.S. Appl. No. 11/227,840, filed Sep. 14, 2005, Gallagher, Michael, Non-Final Office Action of related case mailed: Apr. 21, 2006.
PCT/US2005/040689, Mar. 13, 2006, Kineto Wireless, Inc., International Search Report and Written Opinion of a Related Application (mailed Mar. 13, 2006).
U.S. Appl. No. 10/116,311 (Non-Final Office Action mailed: Feb. 9, 2006), filed Apr. 2, 2002, Jahangir Mohammed.
U.S. Appl. No. 10/115,767 (Non-Final Office Action mailed: Dec. 22, 2005), filed Apr. 2, 2002, Jahangir Mohammed.
U.S. Appl. No. 10/115,835 (Non-Final Office Action mailed: Jul. 25, 2005), filed Apr. 2, 2002, Jahangir Mohammed.
U.S. Appl. No. 10/116,186 (Final Office Action mailed: Feb. 1, 2006), filed Apr. 2, 2002, Jahangir Mohammed.
U.S. Appl. No. 10/251,901 (Non-Final Office Action mailed: May 5, 2005), filed Sep. 20, 2002, Michael D. Gallagher.
U.S. Appl. No. 10/688,470 (Non-Final Office Action mailed: Dec. 15, 2005), filed Oct. 17, 2003, Michael D. Gallagher.
U.S. Appl. No. 11/004,439 (Non-Final Office Action mailed: Sep. 21, 2005), filed Dec. 3, 2004, Michael D. Gallagher.
*Ericsson Press Release*: "Ericsson presents the Mobile@Hometm concept," Mar. 21, 2001, http://www.ericsson.com/press/archive/2001Q1/20010321-0048.html, printed Mar. 21, 2006, pp. 1-2.
Claus Lindholt Hansen et al., "Mobile@Home- a New Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, printed Dec. 8, 2003, 10 pages.
Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.
Wu, Jon C. et al., "Intelligent Handoff for Mobile Wireless Internet," *Mobile Networks and Applications*, 6, 2001 Kluwer Academic Publishers, Manufactured in the Netherlands (2001) 67-79.
"Digital cellular telecommunications system (Phase 2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSI Standards, European Telecommunications Standards Institute, Sophia-Antipo, FR, vol. 3-CN1, No. V560, Dec. 2002, pp. 293-317, XP014007949, ISSN: 0000-0001.
"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.
U.S. Appl. No. 11/225,870, filed Sep. 12, 2005, Gallagher, Michael, Non-Final Office Action of related case mailed: May 30, 2006.
U.S. Appl. No. 11/227,842, filed Sep. 14, 2005, Gallagher, Michael, Non-Final Office Action of related case mailed: Jun. 5, 2006.
U.S. Appl. No. 11/228,853, filed Sep. 15, 2005, Gallagher, Michael, Non-Final Office Action of related case mailed: Jun. 6, 2006.
U.S. Appl. No. 11/229,470, filed Sep. 15, 2005, Gallagher, Michael, Non-Final Office Action of related case mailed: Jun. 5, 2006.

* cited by examiner

METHODS AND APPARATUSES TO INDICATE FIXED TERMINAL CAPABILITIES

Embodiments of the invention relate generally to the field of wireless telecommunications systems and more specifically to methods and apparatuses for indicating the capabilities of fixed terminals for integrated wireless telecommunications networks integrating a licensed wireless system and an unlicensed wireless system.

BACKGROUND

Wireless telecommunications networks exist that integrate licensed wireless systems (LWSs) and unlicensed wireless systems (UWSs) and provide seamless transition between the two.

An LWS refers to public cellular telephone systems and/or Personal Communication Services (PCS) telephone systems, for example, providing service over a licensed spectrum. Such licenses are expensive, as is the equipment used to support communications over these licensed frequencies, and this expense is passed on to the user.

A UWS, on the other hand, may comprise, for example, a base station with a physical connection to a landline providing service to a handset using an unlicensed, free spectrum (e.g., approximately 2.4 GHz or 5 GHz). Typically, the quality of service of an LWS is considerably inferior to the quality of service of a UWS. Thus, the user of an LWS pays relatively high fees for relatively low quality service.

Systems exist that integrate an LWS and a UWS, for example, such systems may integrate a Global System for Mobile Communications (GSM) system and an unlicensed mobile access (UMA) system. Such integrated wireless systems (IWSs) allow service to be provided through the UWS when a user is within an unlicensed wireless service coverage area. The user receives the benefit of the relatively inexpensive, high quality communication service. If the user moves outside of the UWS service coverage area, the same communication session can be maintained without interruption by transitioning to the LWS.

FIG. 1 illustrates a system employing UMA technology in accordance with the prior art. System 100, shown in FIG. 1, includes a GSM system 110 and a UMA system 150. The GSM system 110 typically includes a number of mobile switching centers (MSCs) (e.g., 112a and 112b), representing, for example, a core GSM network. Each MSC 112 typically serves multiple base station controllers (BSCs) 114a-114c, each of which, in turn, serves multiple base station transceiver systems (BTSs) 116a-116c.

The GSM system 110 provides mobile wireless communications to individuals using wireless transceivers, shown for example as user terminal (UT) 118. Wireless transceivers (UTs) include cellular telephones, PCS telephones, wireless-enabled personal digital assistants, wireless modems, and the like. A typical UT may include a display, keypad, and a control circuit. UTs of an IWS typically include two radio transceivers, which may be, for example, a GSM radio transceiver 119 (e.g., operating on a cellular standard), and a UMA radio transceiver 120 (e.g., operating on a wireless local area network (WLAN) standard such as WiFi or Bluetooth). The display may provide a visual indication to a user when the UT is within the service range of the GSM system or the UMA system, the keypad is used in a conventional manner, and the control circuit may be in the form of a processor, a hardwired circuit, a programmable logic device, an application specific integrated circuit, and the like.

As shown in FIG. 1, UMA system 150 is connected to the GSM system 110 through an unlicensed network controller (UNC) 154. The UNC 154 is connected to an MSC (e.g., MSC 112b) of the GSM system 110. Instead of one or more BSCs, MSC 112b has the UNC 154 connected to it. The UNC 154 is connected through an IP network 155 to a plurality of access points (APs), shown, for example, as AP 156. UNC 154 of the UMA system appears to the UT 118 as another cell of the GSM system.

If UT 118 is within the service coverage area of the AP 156, the communication is routed over the higher quality/lower cost UMA system 150. If the UT 118 is not within the service coverage area of the AP 156, the communication is routed over the lower quality/higher cost GSM system 110.

The system 100 can handover a communication between the GSM system and the UMA system. That is, while a communication is in progress the communication can be handed over from routing on the GSM system to routing on the UMA system or vice versa. For example, a user may initiate a communication while moving from one location to another location, and this communication may initially be routed over the GSM system. After arriving at a desired destination, the user may be within the service coverage area of an AP. The communication is then handed over from routing on the GSM system to routing on the UMA system so that the user can take advantage of the higher quality/lower cost of the UMA system. The handover between the GSM system and UMA system is transparent to the user.

The prior art systems typically employ UMA technology and the UMA protocol is hereby incorporated by reference. Such systems have a disadvantage in that difficulties arise in incorporating fixed-terminal devices (FTDs) such as, for example, a fax, a modem, or a regular phone line into current UMA systems. These difficulties have not been adequately addressed.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

Figure 1:
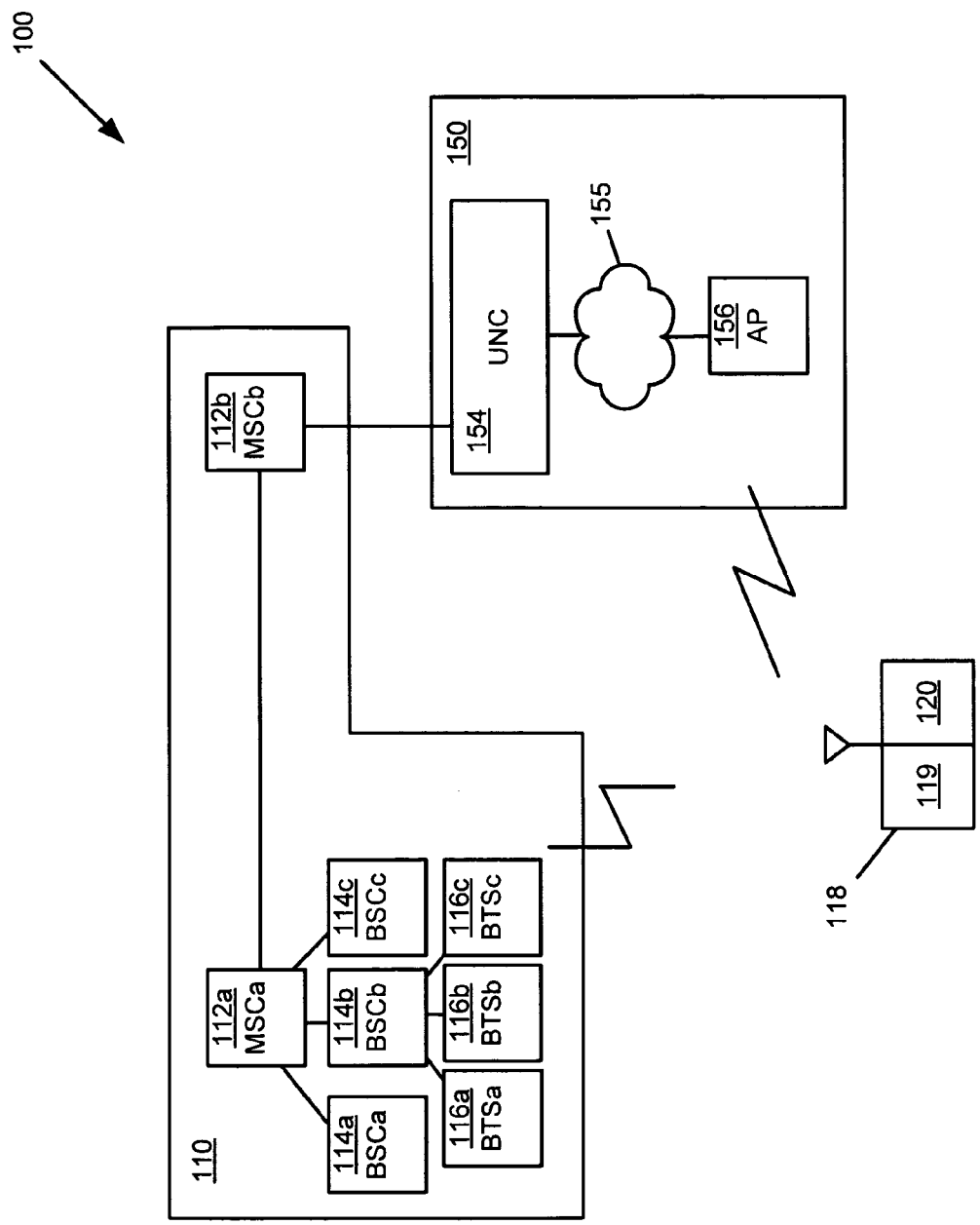
FIG. 1 illustrates a system employing UMA technology in accordance with the prior art.
Figure 2:
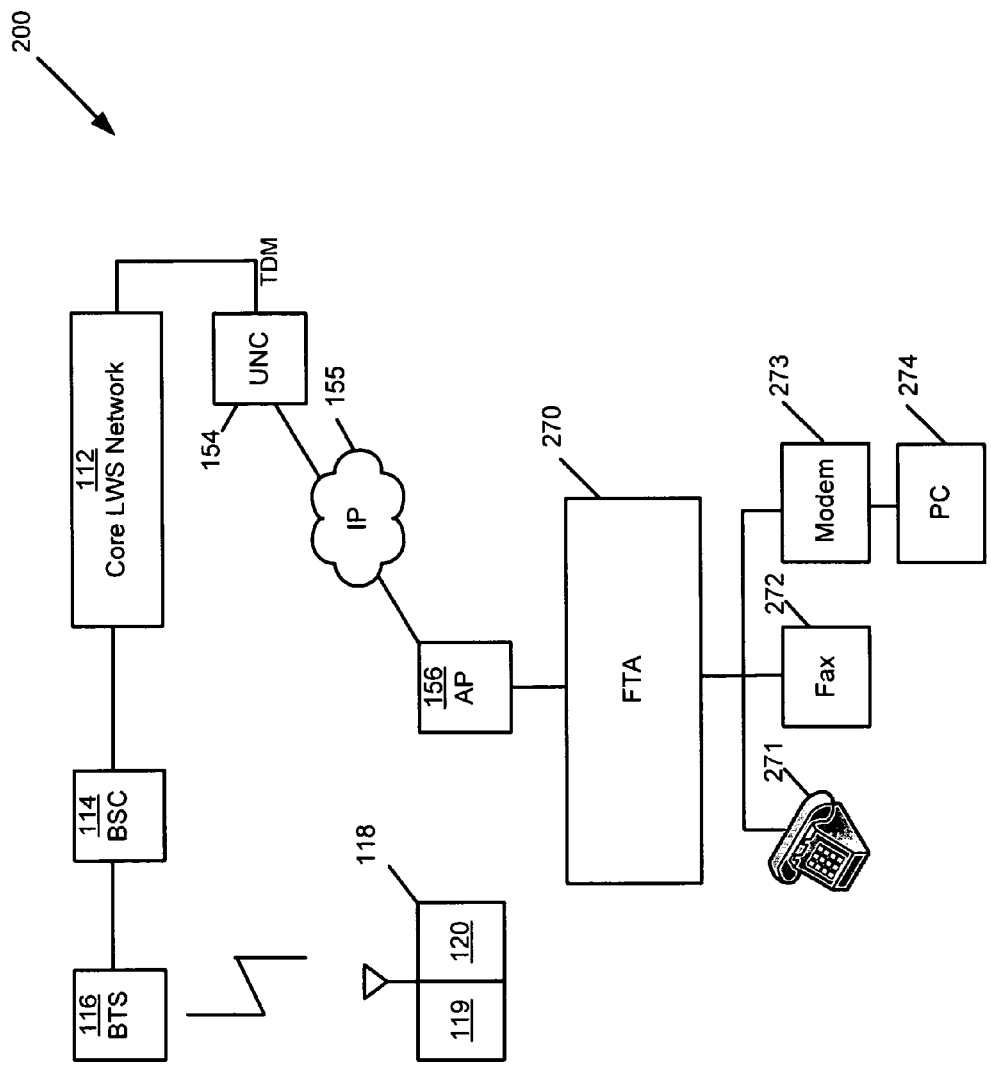
FIG. 2 illustrates a UMA system incorporating a fixed terminal adaptor in accordance with one embodiment of the invention.

Embodiments of the invention provide methods and apparatuses for incorporating fixed-terminal devices (FTDs) within a UMA system using a fixed terminal adaptor (FTA), and to indicate the capabilities of the FTA. In accordance with one embodiment, an FTA is enabled to indicate its capabilities to the UNC. For one such embodiment, the UNC is able to select the appropriate IP-bearer mechanisms to support the expected fixed terminal services. FIG. 2 illustrates a UMA system incorporating a fixed terminal adaptor in accordance with one embodiment of the invention. System 200, shown in FIG. 2, includes the elements of system 100 described above in reference to FIG. 1. Additionally, FIG. 2 illustrates an FTA 270 connected to the IP network 155. For one embodiment, the FTA does not need to connect to an AP 156; separately, an FTA may include AP 156 functions so that it can support fixed and mobile devices connecting to UNC. The FTA 270 allows FTDs such as a conventional phone line 271, a fax 272, or a modem 273 (connected for example, to PC 274) to access the UMA system. For one embodiment of the invention, the FTA emulates a plain old telephone service (POTS) connection from the vantage point of the user (e.g., user receives a conventional dial tone), but internally provides a conversion from POTS to emulate a UT of a UMA system. The FTA is not mobile as would be a conventional UT of a UMA system. It is in a fixed location with one or more FTDs connected to it.

For a UMA system incorporating a FTA having FTDs connected to it, one embodiment of the invention determines what type of codec to use based upon the fixed terminal service. Data (from the UT 118 or from the FTA 270) is converted to an IP-compatible format for transmission over IP network 155.

Voice data is typically converted from an analog signal to a digital signal using a codec, such as the cellular codec, Adaptive Multi Rate (AMR). The UT 118 typically converts the AMR data into IP packets for transmission over the UMA system, which employs a WLAN and IP-networking. This can be viewed as AMR-over-IP.

A UMA system incorporating an FTA 270 does the same, which is appropriate for voice connections (for example, from conventional phone line 271). However, it is problematic to transmit circuit switched data (CSD) such as that from fax 272 or modem 273 as AMR data converted to IP-packets. This is because AMR was designed for cellular voice not CSD. More optimal codecs for CSD exist (e.g. G.711). Therefore, embodiments of the invention allow an FTA of a UMA system to indicate to the UNC that it is a fixed terminal that can support one or more non-cellular codecs.

For one embodiment of the invention, the UNC decides which codec (e.g., AMR or G.711) to use when converting the data to an IP-compatible format based upon the type of client device.

This overview represents some inventive features of various embodiments of the invention, which may contain any one of these features alone or in combination. This overview is provided to facilitate the understanding of specific embodiments of the invention discussed below in reference FIGS. 1-5. This overview does not summarize the invention, nor is it intended to be a summary.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Process

Figure 3:
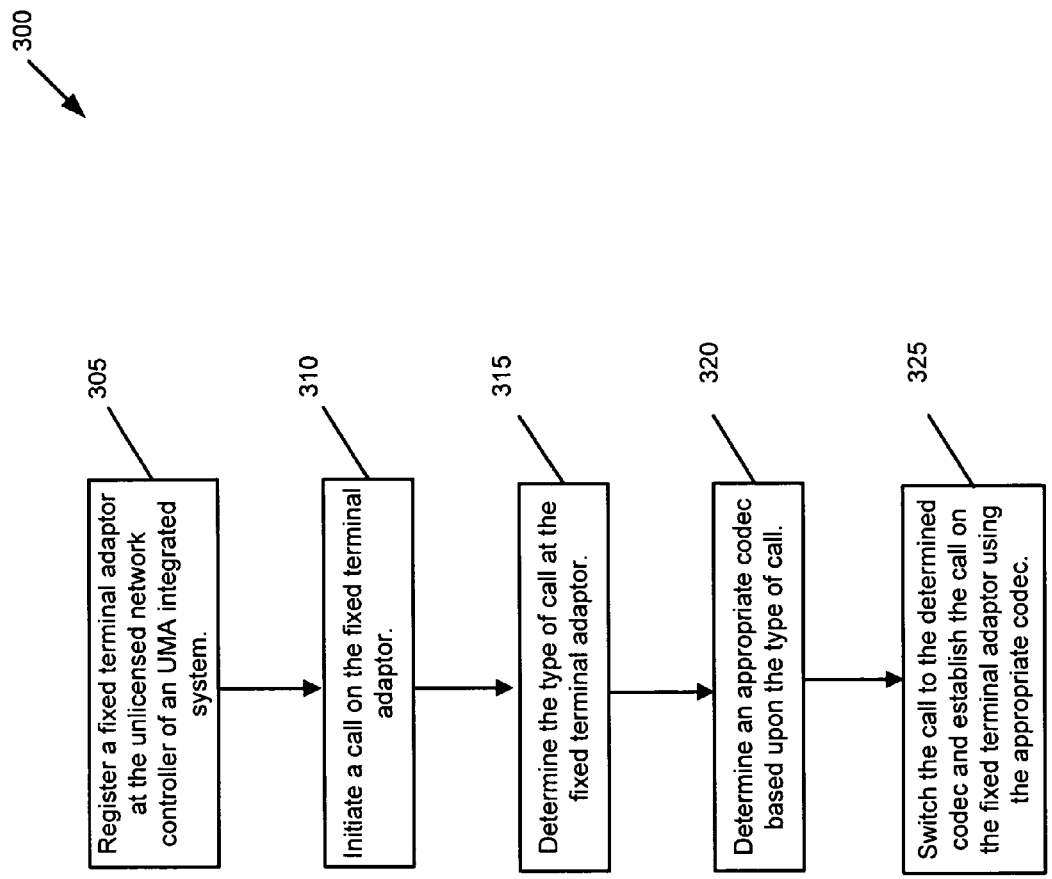
FIG. 3 illustrates a process by which a communication is established on a FTA of a UMA system in accordance with one embodiment of the invention.

FIG. 3 illustrates a process by which a communication is established on a FTA of a UMA system in accordance with one embodiment of the invention. Process 300, shown in FIG. 3, begins with operation 305 in which the FTA is registered with the UNC. In accordance with one embodiment of the invention the UMA device class mark, typically used to register a UT in a UMA system, can be used to indicate to the UNC that the device being registered is a FTA. For one embodiment, the UMA device class mark includes the access network type of the device. For one such embodiment, the access network types that may be included in the UMA device class mark include WiFi (including IEEE 802.11a, 802.11b, and 802.11g), Bluetooth or fixed access (FTA).

For one embodiment, the UMA device class mark includes, in addition to the access network type of the device, the codecs supported by the device. For one such embodiment, the codec types include AMR, G.711, G.721, G.723, G.726, G.728 and G.729.

At operation 310 a call is initiated for the FTA of the UMA system. For one embodiment of the invention, the UNC selects an appropriate codec or codec option for the call during call setup. For one embodiment of the invention the choice of codec is determined by the UNC such that AMR is selected for voice calls and G.711 (or some other CSD-appropriate codec) is used for fax or modem calls.

For an alternative embodiment of the invention the UNC sets up the call so that some or all of the codecs supported by the FTA may be used as determined by the FTA. For example, once the UNC is aware that the call is going to a FTA capable of supporting CSD-appropriate codecs, the UNC sets up the call to employ both a voice-appropriate codec (e.g., AMR) or a CSD-appropriate codec (e.g., G.711), dynamically selectable by the FTA.

At operation 315 the FTA determines the type of call on the FTD. For one embodiment, the FTA effects a tone detector operation to determine the call type. So, for example, when a fax or modem is activated it transmits specific tones to handshake with its remote counterpart. The FTA identifies these tones and distinguishes a CSD type call from a voice call.

At operation 320 the FTA determines an appropriate codec based upon the type of call (e.g., voice or CSD type). For one embodiment of the invention, the FTA uses a tone detector to detect a CSD (e.g., a fax) and selects a codec that is optimal for a fax call (e.g., G.711).

At operation 325 the FTA switches the call to the determined codec, and the call is established on the UMA system using the codec based upon the device type of the FTD. For one embodiment of the invention the FTA can dynamically select a codec during the call. For one embodiment of the invention the default codec may be a voice-based codec (e.g., AMR) and a switch to a CSD-based encoding scheme is only effected upon an indication (e.g., through tone detection) that the FTD is CSD-type device.

System

Figure 4:
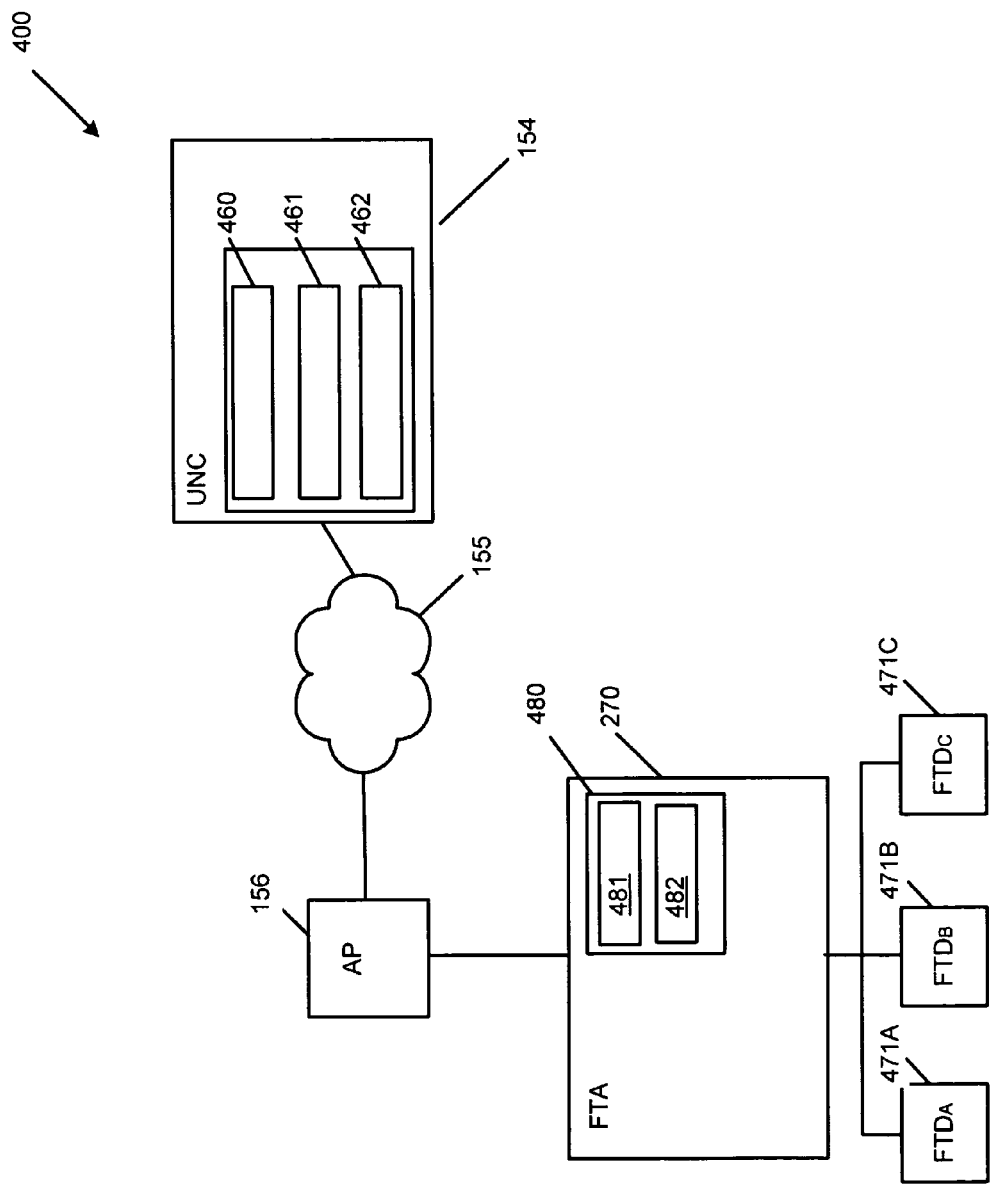
FIG. 4 illustrates a portion of a UMA integrated system incorporating an FTA having modifications to the FTA and the UNC in accordance with one embodiment of the invention.

A system in accordance with one embodiment of the invention is similar to system 200, discussed above in reference to FIG. 2 with modification to the FTA and the UNC FIG. 4 illustrates a portion of a UMA system incorporating an FTA having modifications to the FTA and the UNC in accordance with one embodiment of the invention. UMA system 400 includes an FTA 270 with a number of FTDs shown for example, as FTDs 471A-471C. In accordance with one embodiment of the invention, the FTA includes an extended UMA device class mark functionality that includes an extended access network type field 481 and a supported codec field 482.

The FTA 270 is connected through IP network 155 to modified UNC 154.

The UNC 154 includes a registration module 460 that handles the registrations including the UMA device class mark information. That is, after the FTA affects the registration using the extended UMA device class mark functionality 480, the registration module 460 of UNC 154 accepts and stores this information.

At call set up the UNC 154 determines the codec or codecs to be used from the codecs listed in the supported codec field 482 and programs its media gateway function to accept the codec or codecs from the client device.

The UNC 154 also instructs the client FTA as to what codec or codecs, from the list of supported codecs, to use.

In accordance with one embodiment of the invention the combination of these services will be affected to allow the FTA to indicate its capabilities and allow the UNC to provide the appropriate bearer mechanisms to support the indicated capabilities.

GENERAL MATTERS

Embodiments of the invention provide methods and apparatuses for incorporating fixed devices within a UMA system using a fixed terminal adaptor (FTA), and to indicate the capabilities of the FTA. In accordance with one embodiment, an FTA is enabled to indicate its capabilities to the UNC. For one such embodiment, the UNC is able to select the appropriate bearer mechanisms to support the expected fixed terminal services.

As described above, one embodiment of the invention uses a voice appropriate codec such as AMR for a default codec until a determination is made that the FTD is a CSD-type device. In an alternative embodiment, a CSD as well as voice appropriate codec (e.g. G.711) may be used as a default upon a determination that the call originated from an FTA. Such a scheme, though using more bandwidth (e.g., G.711 uses more bandwidth than AMR), may be easier to implement in some circumstances.

Embodiments of the invention may be implemented in various alternative manners as will be appreciated by one skilled in the art. For example, the codec for a given call is selected by the UNC; for one embodiment the call can be set up to allow both a voice codec and a CSD codec. That is, for example, once the UNC is aware that the call is going to an FTA, it sets up the call for AMR and G.711. At that point, that FTA has the ability to dynamically choose either AMR or G.711 in the middle of a call as discussed above.

For an alternative embodiment, the UNC always sets up the calls using G.711. For this embodiment, the additional expense of using G.711 (G.711 requires greater bandwidth compared with AMR, as discussed above) is accepted.

In another alternative embodiment, the UNC can accept either AMR or G.711 but only one has to be selected for use at the beginning of the call. However, this may require actually changing the (UMA) protocol messages used over the IP interface and such changes require substantial effort to effect if modifications to accepted specifications are involved.

Though described for various embodiments in the context of a UMA system, embodiments of the invention may be applied generally to any IWS. Moreover, for various embodiment of the invention, a GSM system may not be employed, but may be substituted with other time division multiple access (TDMA) systems (e.g., iDEN) as well as code division multiple access (CDMA) systems (e.g., cdma2000, cdmaOne, W-CDMA), frequency division multiple access (FDMA) systems, and space division multiple access (SDMA) systems, or other comparable systems.

The invention includes various operations. Many of the methods are described in their most basic form, but operations can be added to, or deleted from, any of the methods without departing from the basic scope of the invention.

The operations of the invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. The invention may be provided as a computer program product that may include a machine-readable medium having stored thereon instructions, which may be used to program a digital processing system (DPS) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

Figure 5:
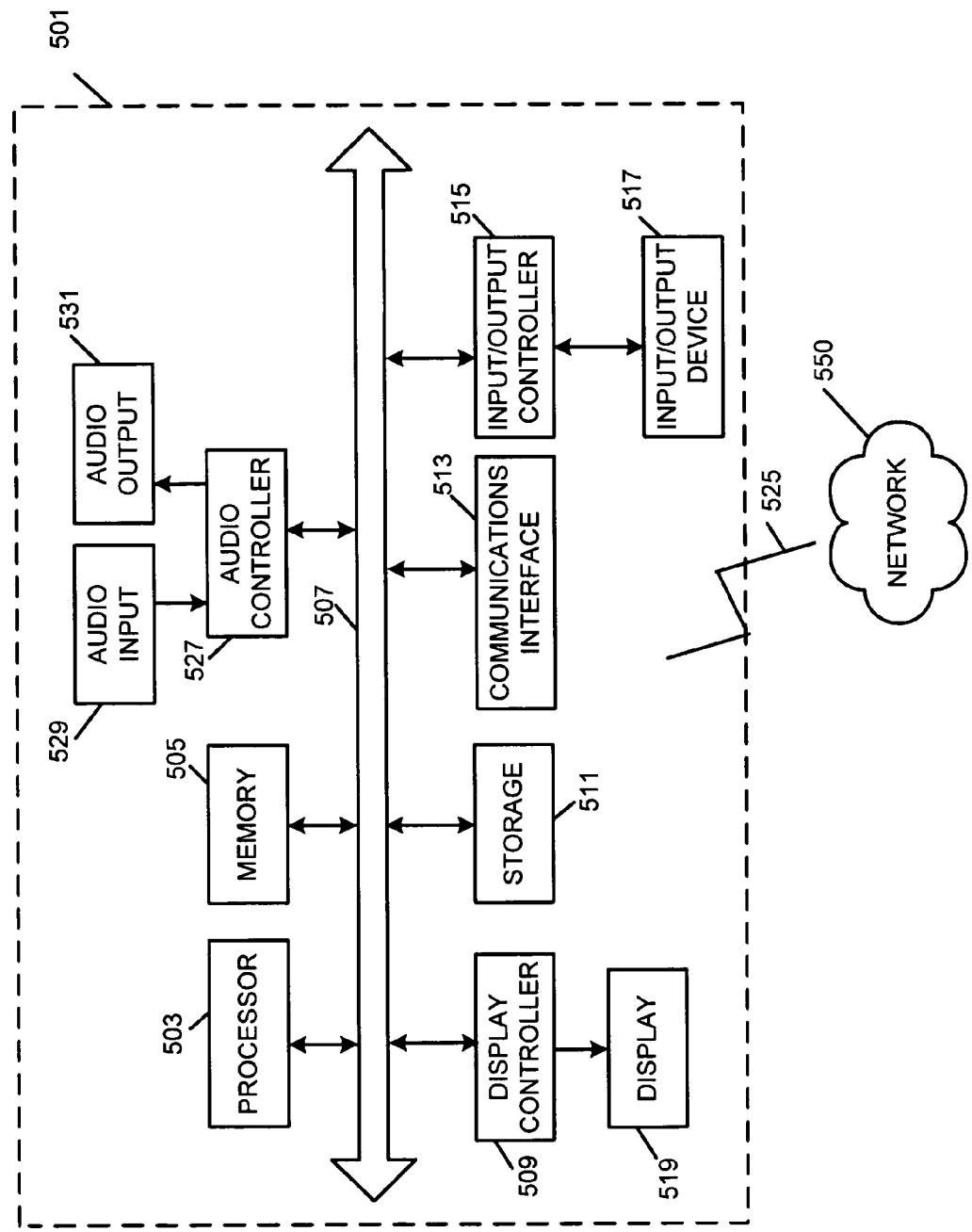
FIG. 5 is a block diagram illustrating one embodiment of a digital processing system (DPS) that may be used in accordance with an embodiment of the present invention.

FIG. 5 is a block diagram illustrating one embodiment of a DPS 501 that may be used in accordance with an embodiment of the present invention as described above. For alternative embodiments of the present invention, DPS 501 may be a computer that includes a processor 503 coupled to a bus 507. In one embodiment, memory 505, storage 511, display controller 509, communications interface 513, input/output controller 515 and audio controller 527 are also coupled to bus 507.

DPS 501 interfaces to external systems through communications interface 513. Communications interface 513 may include a radio transceiver compatible with wireless telephone signals or other interfaces for coupling a device to other devices. In one embodiment of the present invention, carrier wave signal 525 is received/transmitted between communications interface 513 and network 550. In one embodiment of the present invention, a communications signal 525 may be used to interface DPS 501 with another computer system, a network hub, router, or the like. In one embodiment of the present invention, carrier wave signal 525 is considered to be a machine-readable media, which may be transmitted through wires, cables, optical fibers, or through the atmosphere, or the like.

In one embodiment of the present invention, processor 503 may be a conventional microprocessor, such as for example, but not limited to, an Intel x86 or Pentium family microprocessor, a Motorola family microprocessor, or the like. Memory 505 may be a machine-readable medium such as dynamic random access memory (DRAM) and may include static random access memory (SRAM). Display controller 509 controls in a conventional manner a display 519, which in one embodiment of the invention may be a cathode ray tube (CRT), a liquid crystal display (LCD), an active matrix display, a television monitor, or the like. The input/output device 517 coupled to input/output controller 515 may be a keyboard, disk drive, printer, scanner and other input and output devices (e.g., a mouse). In one embodiment of the present invention, audio controller 527 controls in a conventional manner audio output 531 and audio input 529.

Storage 511 may include machine-readable media such as, for example, but not limited to, a magnetic hard disk, a floppy disk, an optical disk, a smart card or another form of storage for data. In one embodiment of the present invention, storage 511 may include removable media, read-only media, readable/writable media, or the like. Some of the data may be written by a direct memory access process into memory 505 during execution of software in computer system 501. It is appreciated that software may reside in storage 511, memory 505 or may be transmitted or received via modem or communications interface 513. For the purposes of the specification, the term "machine-readable medium" shall be taken to include any medium that is capable of storing data, information or encoding a sequence of instructions for execution by processor 503 to cause processor 503 to perform the methodologies of the present invention. The term "machine-readable medium" shall be taken to include, but is not limited to solid-state memories, optical and magnetic disks, carrier wave signals, and the like.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An integrated wireless system comprising:
   a licensed wireless system;
   an unlicensed wireless system communicatively coupled to the licensed wireless system through a network controller; and
   one or more fixed terminal devices communicatively coupled to the integrated wireless system through a fixed terminal adaptor incorporated into the integrated wireless system, the fixed terminal adaptor registering with the integrated wireless system and comprising a device class mark that includes an access network type indicating fixed access, wherein the network controller registers the fixed terminal adaptor and stores the access network type corresponding to the fixed terminal adaptor, wherein the network controller stores a plurality of codecs supported by the fixed terminal adaptor.

2. The integrated wireless system of claim 1 wherein the network controller determines a codec or a set of codecs to be used for a call on the fixed terminal adaptor, the determined codec or set of codecs selected from the plurality of codecs supported by the fixed terminal adaptor.

3. The integrated wireless system of claim 2, wherein the network controller indicates to the fixed terminal adaptor the determined codec or set of codecs.

4. The integrated wireless system of claim 1, wherein the network controller registers devices comprising one of the fixed access, WiFi, and Bluetooth access network types.

5. The integrated wireless system of claim 3, wherein the supported codecs comprise at least two of AMR, G.711, G.721, G.723, G.726, G.728 and G.729.

6. The integrated wireless system of claim 5 wherein a default codec is AMR.

7. The integrated wireless system of claim 3, wherein the integrated wireless system integrates the unlicensed wireless system with the licensed wireless system selected from a group consisting of time division multiple access systems, code division multiple access systems, frequency division multiple access systems, and space division multiple access systems.

8. The integrated wireless system of claim 7, wherein the licensed wireless system is a Global System for Mobile communications (GSM) system.

9. The integrated wireless system of claim 5, wherein a default codec is a codec appropriate to both voice and circuit switched data (CSD).

* * * * *